United States Patent [19]
Niederberger et al.

[11] Patent Number: 5,608,158
[45] Date of Patent: Mar. 4, 1997

[54] APPARATUS FOR THE TESTING OF AIR BAGS

[75] Inventors: Klaus Niederberger, Herbrechtingen; Peter K. Niederberger, Herbrechtingen-Bolheim, both of Germany

[73] Assignee: Althammer GmbH & Co. KG., Heidenheim, Germany

[21] Appl. No.: 376,031

[22] Filed: Jan. 20, 1995

[30] Foreign Application Priority Data

Jan. 25, 1994 [DE] Germany .................. 44 01 985.8

[51] Int. Cl.⁶ .................. G01M 19/00; G01M 13/00
[52] U.S. Cl. .................. 73/37; 73/865.6
[58] Field of Search .................. 73/37, 38, 40, 73/865.6, 865.9

[56] References Cited

U.S. PATENT DOCUMENTS 5,355,740 10/1994 Beaudet et al. .................. 73/865.6
5,404,746 4/1995 Ocker et al. .................. 73/37
5,437,188 8/1995 Frantom et al. .................. 73/709

OTHER PUBLICATIONS

Published application DE 41 43 007 A 1; published Jul. 1, 1993; Germany.

Translation of DE 41 43 007 A1 Dec. 1995.

*Primary Examiner*—Hezron E. Williams
*Assistant Examiner*—Jay L. Politzer
*Attorney, Agent, or Firm*—Malin, Haley, DiMaggio & Crosby, P.A.

[57] ABSTRACT

An apparatus is provided for the testing of air bags in a pressure-sealed container (1), which swivels and is suspended by a frame (5), with lid (11). A removable retainer (16) is in the inside of the container (1) to serve as a receptacle for various air bags or gas producers (30).

18 Claims, 5 Drawing Sheets

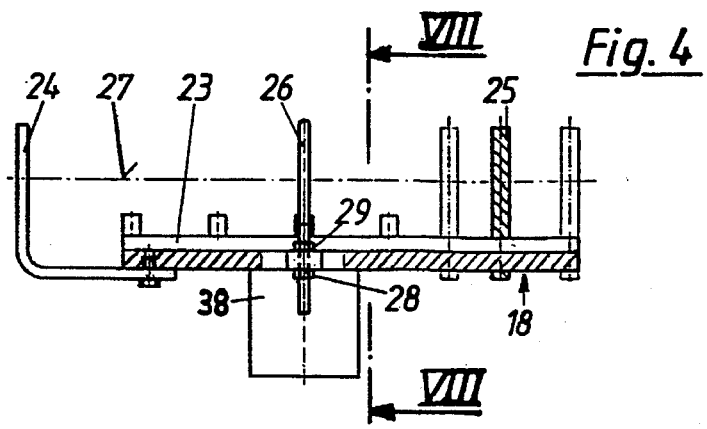
Fig. 4
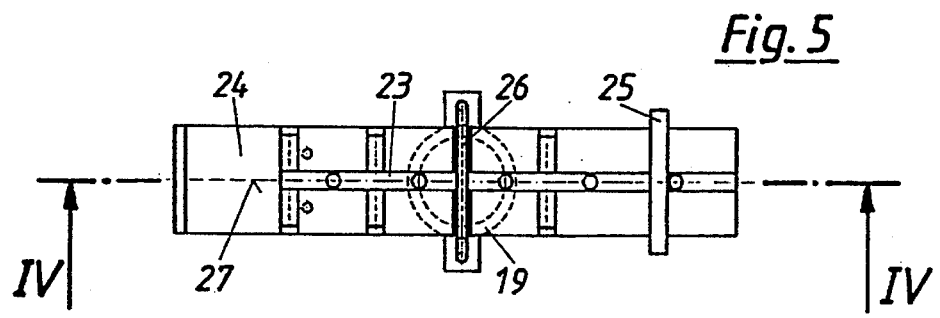
Fig. 5
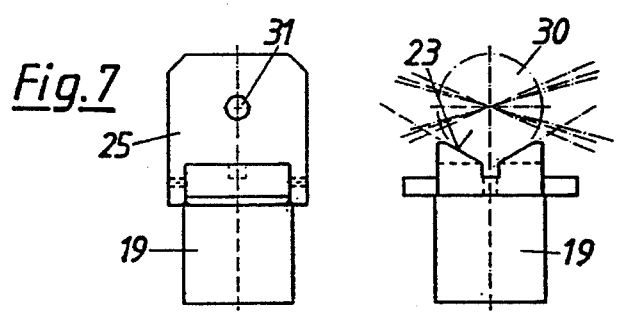
Fig. 7
Fig. 6
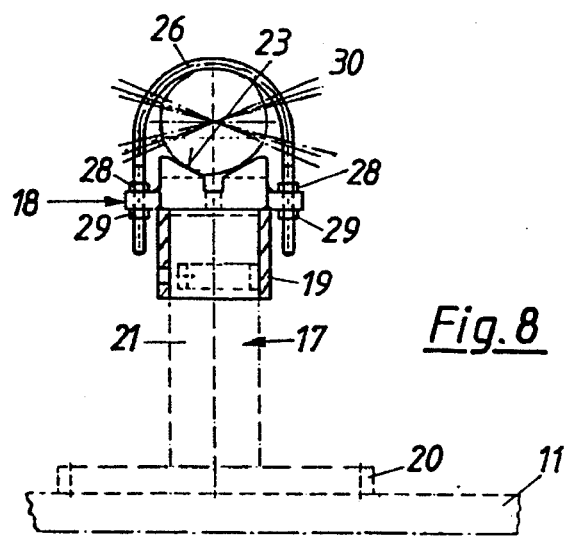
Fig. 8

APPARATUS FOR THE TESTING OF AIR BAGS

TECHNICAL FIELD

The invention refers to an apparatus for the testing of air bags in a pressure-sealed container, which is swivelling and is suspended by a frame, with lid.

BACKGROUND OF THE INVENTION

Air bags mainly consist of a bag and a gas producer which is ignited in order to inflate the air bag. It is thus necessary to guarantee above all the operatability of the gas producer. Therefore air bags and gas producers shall be dealt with in depth below, and the apparatus according to the invention shall always be dealt with in relation to the testing of the air bag gas producer.

Pressure vessels, which are mounted to a stand or frame, have been used in testing the effectiveness of air bags. The vessels generally have pressure-sealed lids. After the lid is closed, a blasting charge or a gas producer (gas cartridge) is ignited and the air bag inflation or pressure expansion is monitored. The safety of the ignition or the pressure build-up/course is checked at the same time.

In this test it is also required to check the residual matter from the blasting charge. The walls of the container are appropriately cleaned with fluid and then the fluid with blasting charge residual matter (residual gas) is analyzed.

In order to allow the fluid out of the container, the container is in most cases mounted in the stand slightly off from perpendicular to the lid, or the container is mounted in the stand so that it can be rotated in order to allow the fluid to run out after opening the lid and then to be poured into another container.

Rotatability of the container has the additional advantage that the inner walls of the container can more easily be cleaned.

One such apparatus for the testing of air bags exists, with the designation No. DE 41 43 007 A1. In the above publication, however, there are no indications how the air bags or gas producer is mounted in the container. However, it is important that the air bags always be in the same position in order to obtain exact test results; moreover, the air bags of various manufacturers differ in terms of size and mounting specifications so that the same retainer is not applicable for every air bag.

SUMMARY OF THE INVENTION

Thus the object of the present invention is to improve the apparatus for the testing of air bags as given under the designation No. DE 41 43 007 A1, with the objective that air bags of various size and form can be easily and accurately tested using one apparatus.

According to the invention the problem is solved by a removable retainer serving as a receptacle for various kinds of air bags, within the container.

The use of a removable retainer affords the advantage of fitting air bags of various sizes quickly and easily into the appropriate retainer, and this in turn allows for a quick and economical air bag testing procedure.

It is possible to attach the retainer to the lid of the container and thereby make the invention more advantageous.

By attaching the retainer to the lid, the retainer can be quickly and easily mounted or demounted, because when the lid is open the retainer can be easily reached.

It is possible to provide the retainer with a spacer and a retaining component in order to mount the retainer as economically as possible.

The spacer can be mounted firmly to inside of the container lid so that only the retaining component needs to be removed when a new air bag is to be placed in the apparatus.

In order to speed up the connection of the retaining component to the spacer, a quick-acting closure can be provided with the retaining component and the spacer.

In this way it is assured that the spacer and the retaining component are quickly and smoothly coupled, thus making the testing of air bags quicker and more effective to carry out.

An advantageous additional component for the invention is a holding apparatus for the air bags which can be attached to the retaining component.

The holding apparatus assures that the air bags are held firmly to the retaining component when the blasting charge is ignited so that there is no distortion of measurements.

As an advantage, the holding apparatus can be so provided that the air bag can be laid upon a prismatic-formed cavity.

In order to provide for a circular housing for the air bags or for the gas producer, a circular housing can be optimally set into the prismatic-formed cavity so that there are only two narrow lines of contact between the prismatic-formed cavity and the housing of the air bags. It is especially advantageous to have a prismatic-formed cavity for various sizes of gas producers because the gas producer should be laid upon the holding apparatus so that only extended contact along a line or at isolated points occurs in order to minimalize heat transmission.

A further advantage of the prismatic-formed cavity is its universal applicability for a large number of various air bag housing forms, because many different kinds of housing forms can be placed into the cavity.

It is possible to tightly hold the air bags with fastening supports so that the air bag housing is not thrown out of the retainer when the blasting charge is ignited.

Because the air bags have various forms and sizes depending on the manufacturers model and the purpose (driver-side air bag or passenger-side air bag), it can be advantageous that at least one of the fastening supports can be relocated onto the retaining component.

In this way one retaining component can be used for a wide variety of different air bags, which eliminates the need to fabricate a completely new retaining component for each air bag model. Here manufacturing costs for the apparatus as defined by the invention can be considerably reduced.

An alternative could be the provision of the fastening support modified to serve as an adjustable clamp.

Adjustable clamps have the advantage of being able to accommodate to various air bag sizes and housing forms and are thus universally applicable. An adjustable shackle can also be used to serve as additional fastening strength in combination with the interlocking fastening support mentioned above.

Another possibility for serving the function of the fastening support is a toggle catch. Toggle catches and their advantages are well-known in the construction of such apparatus, and therefore it is not necessary to describe them in depth.

The provision of a belt, chain or other similar mechanism by which the container, or the frame in which the container is housed, can be moved is a possibility which allows for mobility of the pressure-sealed container.

Because the container as conceived in the invention may be considerably heavy (up to 200 kg), the simple manual operation of the container is often problematic; in this case, driving torque generated by, for example, an electric motor could move the container in combination with a belt, chain or other similar mechanism. Of course, the container could also be moved manually.

To ensure that measurements are not distorted, the provision of a container made from high-alloyed steel with at least 9% nickel is an advantageous possibility.

This austenitic steel does not corrode (corrosion can occur as a result of the ignition of explosive agents in the container cavity); it is also a poor conductor of heat which is advantageous for obtaining relatively accurate pressure and temperature measurements in the container cavity. A further advantage of austenitic steel is that it is not composed of ferromagnetic material so that distortion of measurements is also hereby prevented.

Nevertheless, as an alternative the container can be made out of another type of non-magnetic steel.

In order to allow for relatively large scale manufacture and relatively high tolerances of containers, the provision of a filler mounted in the container to gauge volume is an advantageous possibility.

This means that a container with relatively high ranges of tolerances can be produced and, in a subsequent operation, a filler can be placed in the container; the volume of the filler is calculated so that the difference between the inner volume of the container and the volume of the filler results in the desired (norm) volume. This volume is, for example, 60 liters±1 liter for driver-side air bag testing and 146 liters±1 liter for passenger-side air bag testing.

An alteration to the invention that can be provided for, which is advantageous but not of obvious necessity, is a counterweight to the container that can be pushed into the frame.

By extending the counterweight into the frame, the relatively heavy weight of the container (up to 200 kg) can be balanced in such a way so that a large degree of stability can be attained for the apparatus as described in the invention. The extension of a counterweight into the frame allows for the easy use of various sizes of counterweights depending on the intended use and the size of the container.

The frame can be easily manufactured in profiles. The counterweight can be pushed into the hollow profiles without difficulty and secured against sliding inside the hollow profile.

Movement of the counterweight can be avoided by welding or bolting down the counterweight in the frame. By weld joint what is meant here is not only a welded seam but also simple spot welding.

Below is an illustration and example of the design of the apparatus as defined in the invention and described according to principles.

DETAILED DESCRIPTION OF THE INVENTION

Figure 1:
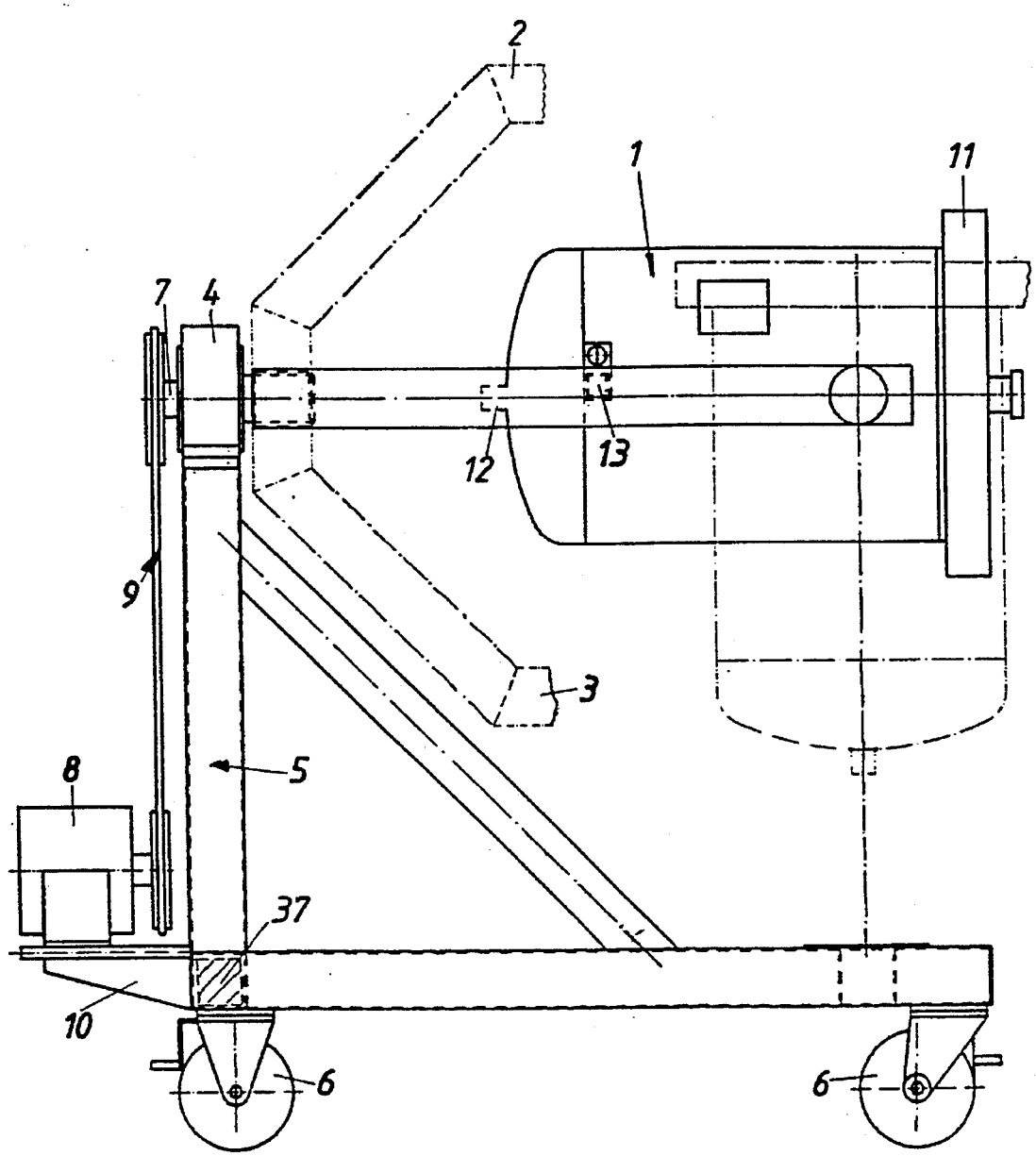
FIG. 1 Side view of an example of the design of the apparatus as defined in the invention, FIG. 2 enlargement of detail II in FIG. 2, FIG. 3 side view of a spacer, FIG. 4 a profile of a retainer along the IV—IV line in FIG. 5, FIG. 5 a top view of a retainer, FIG. 6 a side view of the retainer, FIG. 7 another side view of the retainer, FIG. 8 a side view of an air bag placed in the retainer and secured by a clamp, FIG. 9 front view of holding apparatus which serves a toggle catch, FIG. 10 side view of the arrangement of parts in FIG. 9, and FIG. 11 a top view of the arrangement of parts in FIG. 9.

In reference to FIG. 1, a side view of a apparatus for the testing of air bags is presented. A pressure-sealed container 1 is held between two forked braces 2 and 3 so that it is rotatable. The forked braces 2 and 3 are also rotatable and lodged in bearing 4 so that pressure-sealed container 1 is, seen as a whole, gimbal- or universal-mounted. If needed, however, a simple swivel attachment on only one level, e.g., the vertical level, is sufficient. The bearing 4 is mounted to frame 5. Frame 5 is a weldment made out of square hollow profile so that the frame itself is relatively light. Rollers 6 are attached on the underside of frame 5 which enable smooth transport of the apparatus for the testing of air bags.

By means of a shaft 7 which goes through bearing 4 and onto which a pulley, a chain wheel or a similar part is mounted, the pressure-sealed container 1 can be moved by an electric motor-driven chain or belt mechanism. The electric motor 8 is mounted on a bracket 10 which is mounted onto frame 5.

The container 1 comprises a swivel lid 11. At the bottom of the pressure-sealed container 1, that is, on the opposite side of the container 1 from the lid 11, is an outlet 12 for the emptying of cleaning fluid. If the container 1 is turned 90 counter-clockwise into the position shown by the broken line in the sketch, then the cleaning fluid can be easily filled through the lid opening of container 1 and let out through the outlet 12.

A filler 13 is mounted in the inside of the container. The volume of filler 13 is not set, but rather depends on the volume of container 1, and it is determined after the container is produced. The geometrical form of the filler is also not of importance.

Because certain volumes are necessary (driver-side air bags: 60 liters, passenger-side air bags: 146 liters) for ignition of gas producers in the testing of air bags, the tolerances in manufacturing of the volume of container 1 can be balanced through the insertion of the filler 13. Here the volume of filler 13 is determined so that the difference between the volume of container 1 and the volume of filler 13 is the desired volume, that is, for example, 146 liters or 60 liters, with a tolerance of ±1 liter.

Figure 2:
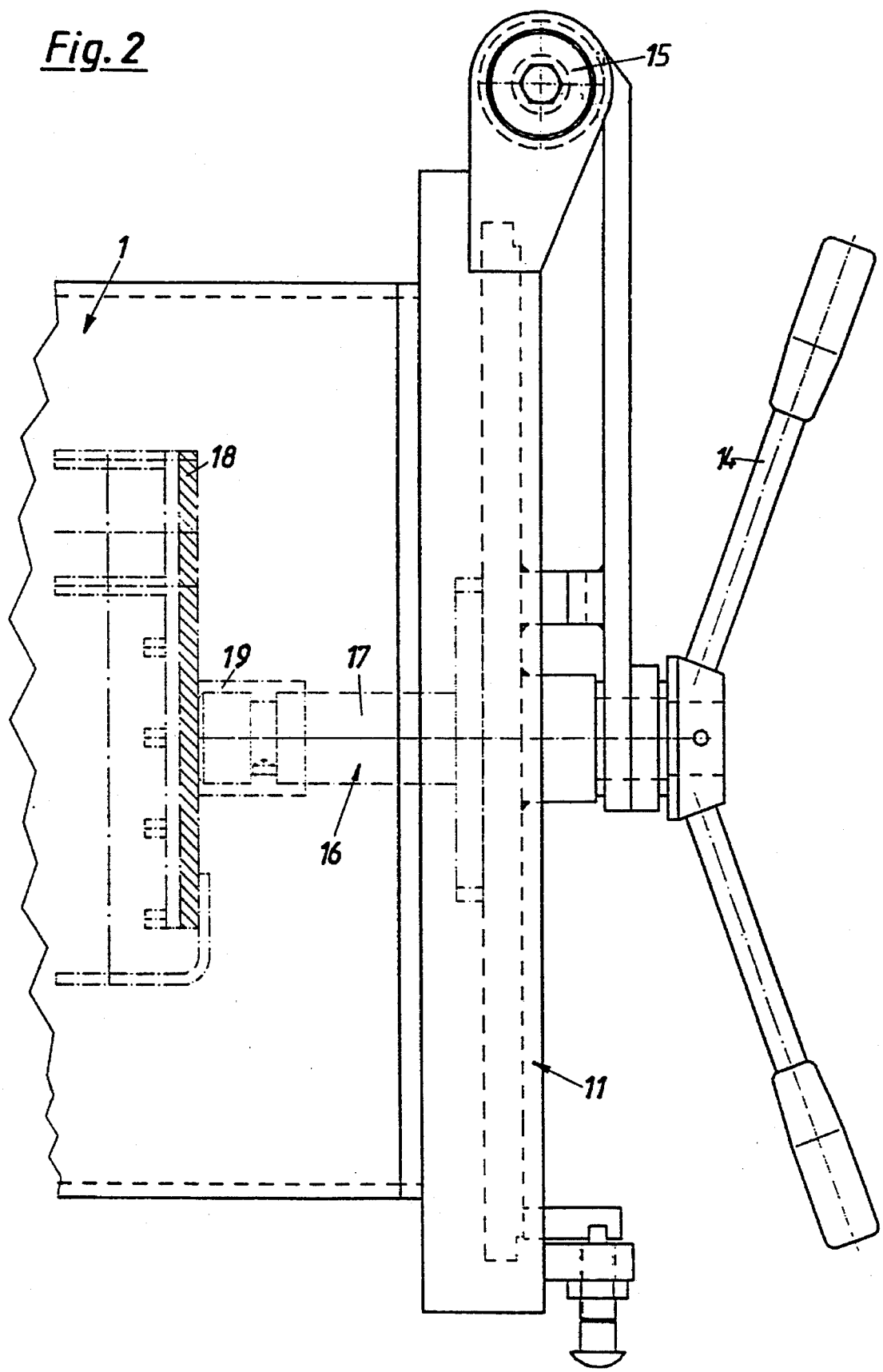

FIG. 2 shows an enlargement of detail II of FIG. 1. An apparatus which closes and seals container 1 under pressure is mounted on the lid 11 of container 1. This apparatus is actuated by a crank handle 14.

The lid is swivelling around bearing 15 in order to enable its swinging, and the bearing 15 is mounted to the pressure-sealed container 1.

A retainer 16, which in essence consists of two parts, is mounted on the inside of the lid 11; the two parts are a spacer 17 and a retaining component 18. The spacer is mounted to the lid 11 and the retaining component 18 is connected by a quick-acting closure 19 to the spacer 17. Because the spacer 17 is connected with a detachable connection, e.g., with a screw connection, to the lid 11, the spacer 17 can be removed if necessary.

The quick-acting closure 19 in the enclosed sketch is designed as a sleeve attached to the retaining component 18; the sleeve is set on a complementary bolt on the spacer and is locked in place or screwed tightly by the bolt. However, any other type of quick-acting closure can be used.

By virtue of the 2-part construction of the retainer 16, namely, the spacer 17 and the retaining component 18, the retaining component 18 can be separated from the spacer 17 by opened lid 11 and thus the retaining component 18 can be easily removed from the container 1, so that a new air bag or gas producer can be placed, outside the container 1, into the retaining component 18. As an alternative procedure a new air bag can be placed into an extra retaining component 18 outside container 1 also during the testing of another air bag in container 1; then immediately after completion of the test the retaining component 18 is replaced with the new air bag and thus the whole testing procedure can be carried out continuously in relatively quick steps.

Figure 3:
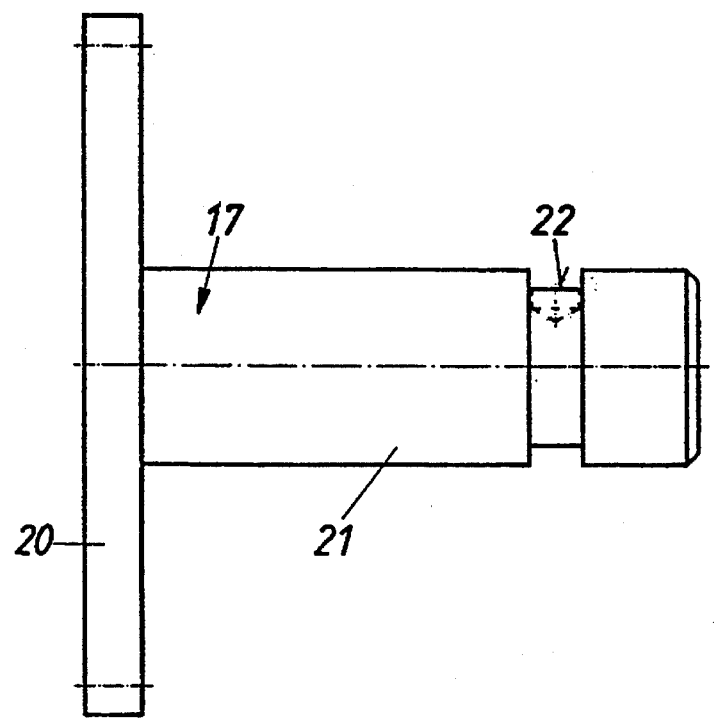

FIG. 3 shows a side view of the spacer 17 mentioned above in connection with FIG. 2. The spacer 17 is mounted onto the inside of the lid 11 by a circular flange 20, which is connected firmly to a shaft 21. A spring-mounted thrust member, for example, can be latched into a revolving groove 22 on the shaft 21 so that quick replacement or a quick connection of the retaining component 18 with the spacer is simply and easily made.

FIG. 4 shows a profile of a retaining component along the IV—IV line in FIG. 5.

The retaining component 18 fundamentally consists of a mounting plate with a prismatic-formed cavity 23, a bearing bush (shell) 38 to connect the quick-acting closure with the spacer 17, interlocking fastening supports 24 and 25, and an adjustable clamp 26.

The longitudinal axis of an air bag or a gas producer situated on the retaining component 18 is shown by the broken line and the number 27.

There are notches (recesses) along the extension of line 27 in the interlocking fastening supports 24 and 25 in which projecting parts of the air bag, such as catches, pins/bolts and similar parts, can be inserted. In the sketch the interlocking fastening support 24 is screwed tightly onto the prismatic-formed cavity 23, while the interlocking fastening support 25 can be moved in the direction of the broken line 27 so that an air bag can be quickly and easily set onto the retaining component 18. In addition, the adjustable fastening support 25 can be used with gas producers of various lengths.

An adjustable clamp 26 is provided along with the interlocking fastening supports 24 and 25; this adjustable clamp secures the middle area of the air bag or gas producer housing against falling out or being pitched out during ignition of the blasting charge. The height of the clamp 26 can be optimally adjusted to the respective air bag housing diameter by re-adjusting the adjusting nuts 28 and 29. The gas producer is situated with its underside in the prismatic-formed cavity 23 so that the gas producer is secured all over against shifting or being pitched out during blasting. The sleeve 19 is situated under the mounting plate with the prismatic-formed cavity 23; this sleeve is a component of the quick-acting closure with the spacer 17 (which is not shown).

In order to clarify the view in FIG. 4, a top view of this arrangement is given in FIG. 5. The parts shown in FIG. 4 are given the same numbers in FIG. 5 so that the assembly of the retaining component 18 is more easily understood.

FIG. 6 shows a side view of the retaining component 18; this sketch does not show the interlocking fastening supports 24 and 25 and the clamp 26. An air bag or gas producer, indicated by the rounded broken line, is situated on the mounting plate with the prismatic-formed cavity 23. Under the mounting plate is the sleeve 19 of the quick-acting closure 19 for the coupling of the retaining component 18 with the spacer 17.

FIG. 7 shows a side view of the arrangement in FIG. 4, yet with the arrangement seen from the right side of FIG. 4.

A bore hole 31 is in the interlocking fastening support 25 so that projecting parts of the air bag, for example catches or pins, can be positively locked in. Another form of recess, instead of the bore hole 31, can be provided for the interlocking fastening support 25, depending on the form and size of the above-mentioned projecting parts of the air bag. This recess can also be provided in the other interlocking fastening support 24 (see FIG. 4) or in both fastening supports so that an optimal mounting of the air bags onto the retaining component 18 is possible.

FIG. 8 shows a profile of the retaining component 18 along the VIII—VIII line in FIG. 4.

The air bag 30 is situated on the mounting plate with the prismatic-formed cavity 23 and secured by the adjustable clamp 26. The distance of the adjustable clamp 26 to the mounting plate with the prismatic-formed cavity 23 is adjustable by using nuts 28 and 29. The retaining component 18 is coupled with the spacer 17 by the quick-acting closure 19; the spacer is in turn connected to the inner side of the lid 11 of the container 1 by the flange 20. The spacer 17, the flange 20 and the lid 11 of the container 1 are shown in the sketch in FIG. 8 by broken lines. The mounting of the retaining component 18 onto the shaft 21 of the spacer 17 is effected by a screw which is not shown, which screws through the wall of the sleeve 19 into the revolving groove 22 and to the shaft 21, and thus secures that the retaining component 18 does not twist or slide on the shaft 21.

Figure 9:
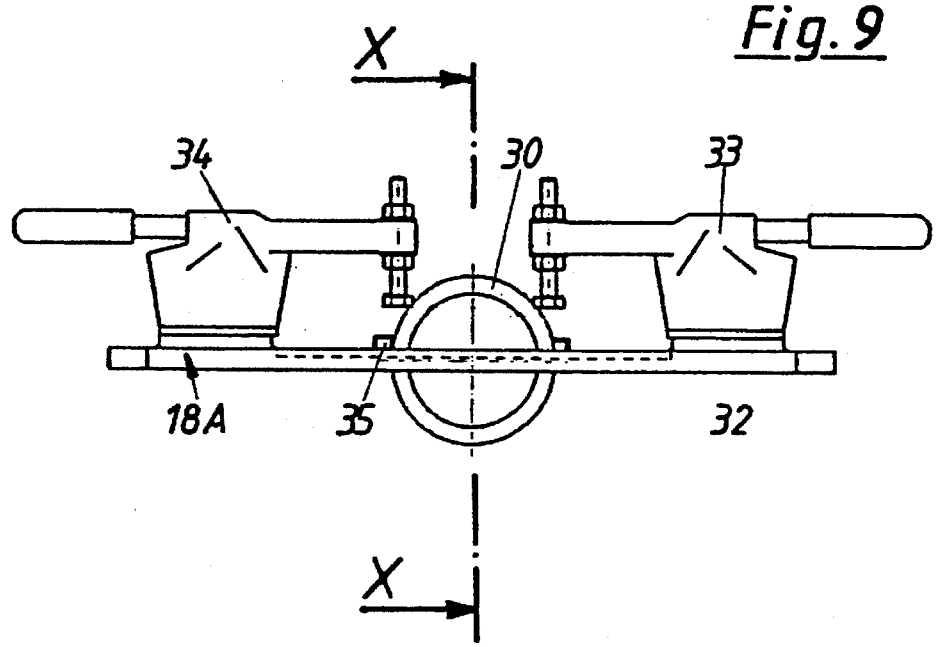

FIG. 9 shows an alternative design of the retaining component 18, which is given the number 18a in this sketch. The air bag or gas producer 30 is secured in a recess, which has the appropriate dimensions, in the mounting plate 32; the air bag or gas producer is situated on the mounting plate with mounted flanges 35 at the side of the gas producer; the air bag or gas producer is pressed from above against the mounting plate by toggle catches 33 and 34.

Figure 10:
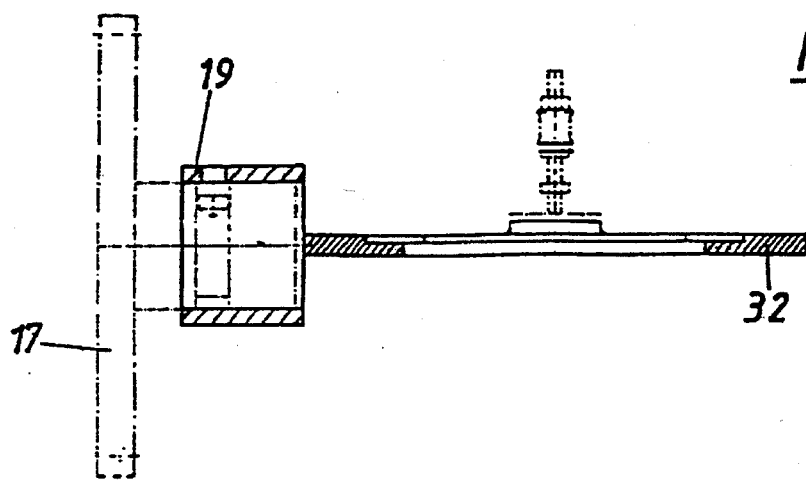

FIG. 10 shows a profile in the line X—X of FIG. 9.

In this sketch it is clear that the mounting plate 32 is mounted to a sleeve, which is a component of the quick-acting closure 19. A connection to the spacer 17, which in turn is attached to the inside of the lid 11 of the container 1, is made by this quick-acting closure 19. The functioning of the quick-acting closure 19 has already been described.

Figure 11:
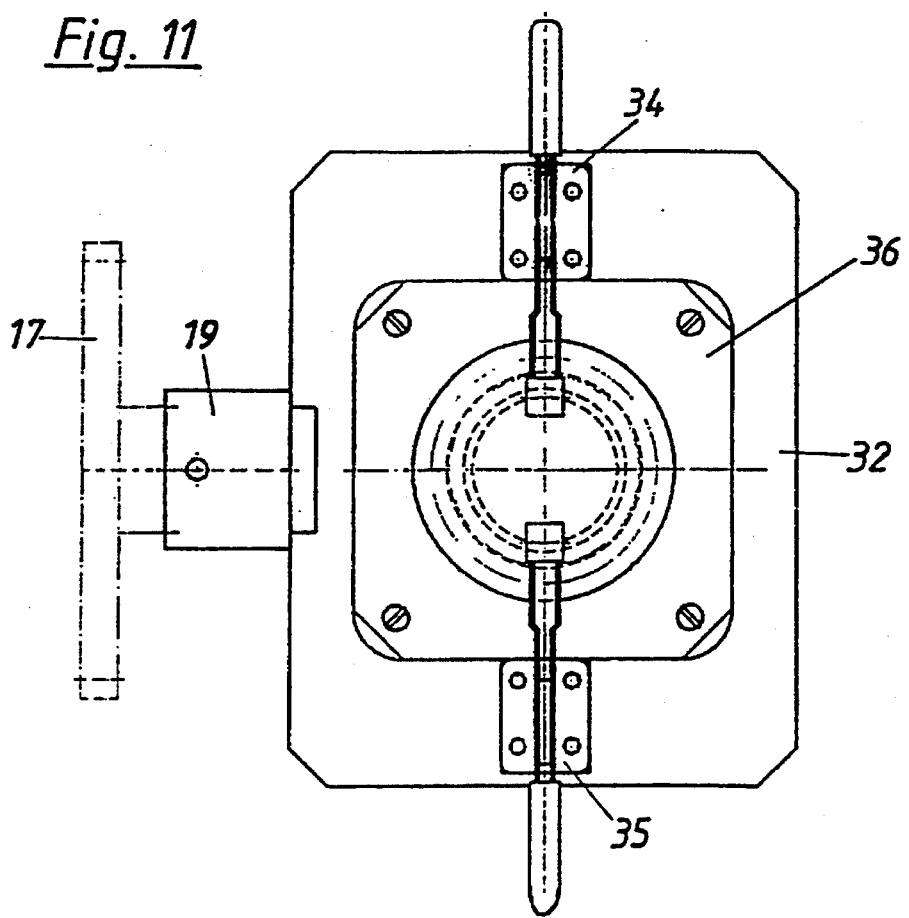

FIG. 11 shows a top view of FIG. 9. In the mounting plate 32 is an additional recess into which a distance plate 36 is lodged, upon which an air bag is set. The toggle catches 34 and 35 are arranged on the mounting plate 32 so that the gas producer is held firmly.

Referring again to FIG. 1, in a hollow section of frame 5 there is least one counterweight 37 which at least partially balances weight for the pressure-sealed container 1. Because the pressure-sealed container has a mass of up to 200 kg, the counterweight 37 inserted in the hollow profile considerably increases the stability of the apparatus for the testing of air bags.

In order to prevent the counterweight 37 from shifting inside the hollow profile, weld joints or screw joints (which are not shown in the sketch) are between the counterweight 37 and the respective hollow profile so that the counterweight 37 cannot shift nor slide.

We claim:

1. An apparatus for the testing of air bags, comprising:
   a frame member;
   a sealed container capable of being pressurized, said container suspended by said frame member, said container being able to swivel and having a lid member; and
   a removable retaining means disposed within said container, said retaining means serving as a receptacle for various air bags or gas producers, said retaining means attached to said lid member.

2. The apparatus as claimed in claim 1, wherein the retainer comprises a spacer and a retaining component.

3. The apparatus as claimed in claim 2, wherein the spacer and the retaining component are connected to each other by a quick-acting closure.

4. The apparatus of claim 1 further including an air bag holding apparatus associated with said removable retaining means.

5. The apparatus as claimed in claim 4, wherein the holding apparatus includes a angled cavity and the air bag is set upon said angled cavity.

6. The apparatus as claimed in claim 1, wherein the removable retaining means includes a plurality of fastening supports and the air bags are held interlocked by said fastening supports.

7. The apparatus as claimed in claim 6, wherein at least one of the fastening supports is removable.

8. The apparatus as claimed in claim 6, wherein at least one of the fastening supports is realized as an adjustable clamp.

9. The apparatus as claimed in claim 6, wherein at least one of the fastening supports is equipped to serve as a toggle catch.

10. The apparatus as claimed in claim 1, wherein the container is movable manually or by a motor, driven by a belt, chain or similar type of mechanism.

11. The apparatus as claimed in claim 1, wherein the container is made from a high-alloy steel with at least 9% nickel.

12. The apparatus as claimed in claim 1, wherein the container is made from nonmagnetizable steel.

13. The apparatus as claimed in claim 1, wherein the container has mounted into it a filler to gauge the volume.

14. The apparatus of claim 1 further including a counterweight member insertable within said frame member.

15. An apparatus for the testing of air bags, comprising:
    a frame member;
    a sealed container capable of being pressurized, said container suspended by said frame member, said container being able to swivel and having a lid member, said lid member having a removable retaining means attached thereto; and
    a counterweight member insertable within said frame member.

16. The apparatus as claimed in claim 15, wherein the frame is made out of hollow profiles.

17. The apparatus as claimed in claim 15, wherein the counterweight inserted within the frame is secured against shifting or sliding.

18. The apparatus as claimed in claim 17, wherein the counterweight is welded or bolted into the frame.

* * * * *